(12) United States Patent
Hu

(10) Patent No.: US 7,980,737 B2
(45) Date of Patent: Jul. 19, 2011

(54) ELECTRONIC DEVICE SUPPORT

(75) Inventor: Rui-Bin Hu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 193 days.

(21) Appl. No.: 12/494,313

(22) Filed: Jun. 30, 2009

(65) Prior Publication Data
US 2010/0223758 A1 Sep. 9, 2010

(30) Foreign Application Priority Data

Mar. 5, 2009 (CN) .................... 2009 1 0300697

(51) Int. Cl.
*F21V 19/00* (2006.01)

(52) U.S. Cl. .................... 362/382; 362/217.14; 362/370; 362/371; 248/346.3; 248/349.1; 248/188; 248/176.3; 361/679.09

(58) Field of Classification Search ............... 248/346.3, 248/349.1, 346.01, 176.3, 188, 188.1, 188.8, 248/188.2, 188.6, 146, 150, 163.1, 165, 166, 248/434, 168, 439, 440; 362/382, 217.01, 362/217.14, 257, 370, 371; 361/679.01, 679.02, 679.09, 679.2

See application file for complete search history.

(56) References Cited

U.S. PATENT DOCUMENTS

| | | | | | |
|---|---|---|---|---|---|
| 5,505,413 | A | * | 4/1996 | Hennessey | 248/166 |
| 5,957,417 | A | * | 9/1999 | Yu | 248/166 |
| 6,533,228 | B1 | * | 3/2003 | Yu | 248/166 |
| 6,758,585 | B1 | * | 7/2004 | Chan | 362/414 |
| D575,293 | S | * | 8/2008 | Derry et al. | D14/447 |
| 7,712,719 | B2 | * | 5/2010 | Derry et al. | 248/346.06 |
| D620,941 | S | * | 8/2010 | Stacey et al. | D14/447 |
| 2002/0088914 | A1 | * | 7/2002 | Yu | 248/434 |
| 2006/0028827 | A1 | * | 2/2006 | Lo | 362/382 |
| 2008/0265109 | A1 | * | 10/2008 | Derry et al. | 248/149 |
| 2009/0140119 | A1 | * | 6/2009 | To et al. | 248/455 |
| 2010/0243850 | A1 | * | 9/2010 | Derry | 248/372.1 |

* cited by examiner

*Primary Examiner* — Terrell Mckinnon
*Assistant Examiner* — Todd M. Epps
(74) *Attorney, Agent, or Firm* — Frank R. Niranjan

(57) ABSTRACT

An electronic device support includes a V-shaped base, a supporting leg, a cable and a number of lights. The V-shaped base includes a pair of legs extending from an apex of the V-shaped base. The supporting leg is pivotably connected to the V-shaped base adjacent to the apex. The cable is embedded in at least one of the legs and the supporting leg and includes a connector plug electrically connected to the other end. The lights are rotatably mounted on one of the distal end of the legs of the base away from the apex of the V-shaped base.

12 Claims, 4 Drawing Sheets

ELECTRONIC DEVICE SUPPORT

BACKGROUND

1. Technical Field

The present disclosure relates to supports, particularly, to an electronic device support.

2. Description of Related Art

Support stands are convenient when used to support electronic devices, such as laptops, at a proper position and angle for view. However, most support stands provide one function and that is to support the device.

Therefore, there is room for improvement in the art.

DETAILED DESCRIPTION

Figure 1:
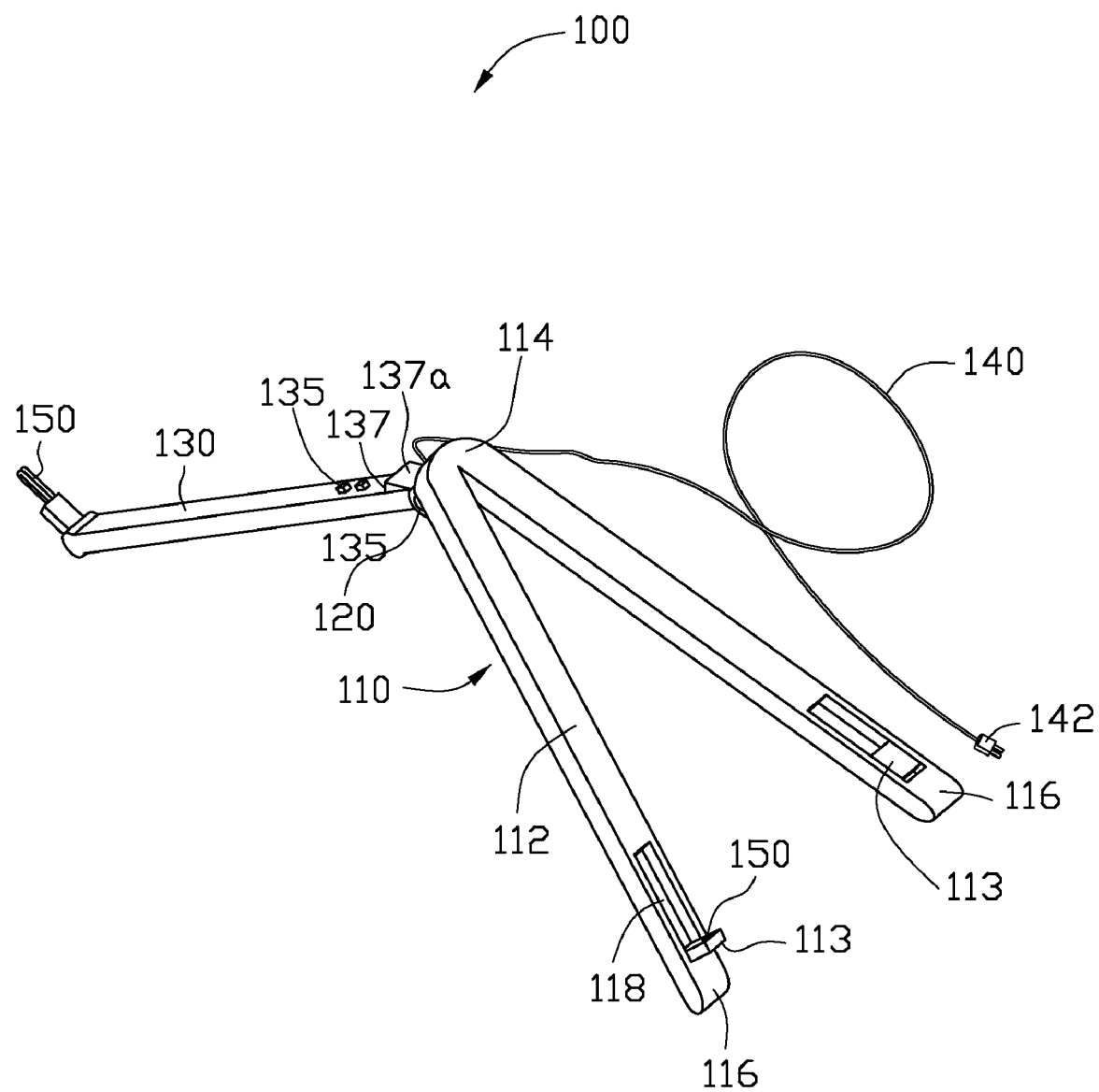
FIG. 1 is an isometric view of an electronic device support according to an exemplary embodiment.
Figure 2:
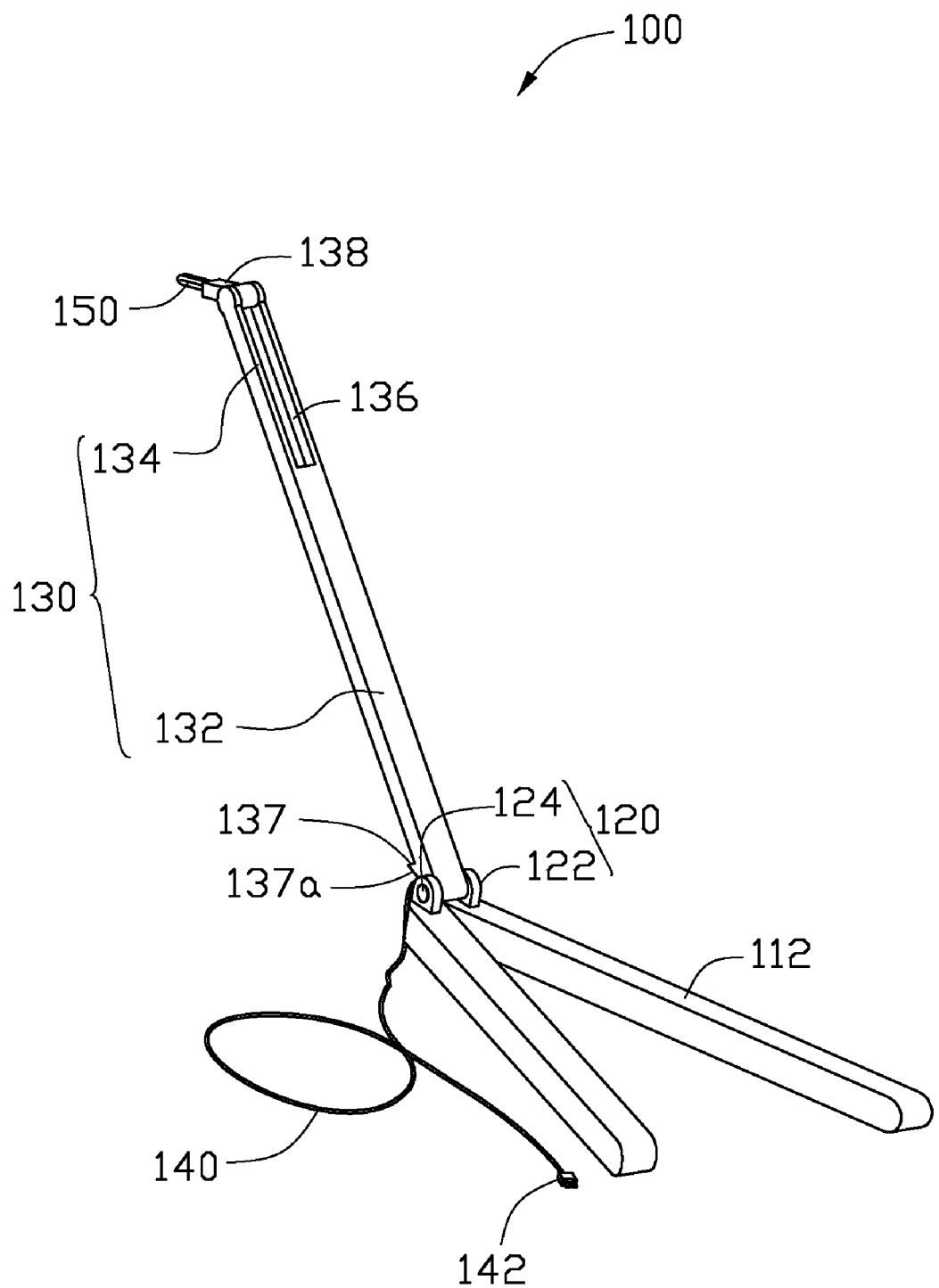
FIG. 2 is an isometric view of the electronic device support of FIG. 1 viewed from another perspective.

Referring to FIGS. 1 to 2, an electronic device support 100 in accordance with one embodiment is disclosed. The electronic device support 100 includes a V-shaped base 110 (hereinafter also called base), a hinge 120, a supporting leg 130, a cable 140 and a number of lights 150. The base 110 includes a pair of legs 112 extending from an apex of the base 110 correspondingly. The supporting leg 130 is rotatably mounted on the base 110 adjacent to the apex of the base 110 via the hinge 120. The cable 140 is embedded in the legs 112 and the supporting leg 130 by one end thereof. The cable 140 further includes a connector plug 142 electrically connected to the other end of the cable 140. One of the lights 150 is rotatably mounted on one distal end of the legs 112 away from the apex of the base 110 and the other lights 150 are separately and rotatably mounted on another legs 112 of the base 110 and the supporting leg 130 away from the apex of the base 110. The lights 150 are electrically connected to the cable 140.

Each of the legs 112 includes a connecting end 114 and a first free end 116 on opposite sides of the legs. The connecting ends 114 of the two legs 112 are connected together at an angle preferable smaller than 180 degrees. Each of the legs 112 defines a slot 118 adjacent in the first free end 116 and includes a first limiting member 113 rotatably received in the slot 118 at one end for housing one of the lights 150 correspondingly. Two pivot points of each first limiting member 113 in the slot 118 are close to an end of the slot 118 and adjacent to the first free end 116, the first limiting member 113 is perpendicular to the legs 112 when the first limiting member 113 is rotated out from the slot 118.

The hinge 120 includes a knuckle 122, and a pivot shaft 124 rotatably received in the knuckle 122. The knuckle 122 is mounted on the base 110 at a surface adjacent to the apex of the base 110 and opposite to the surfaces of the legs 112 defining the slots 118. The shaft 124 is mounted on an end of the supporting leg 130 and pivotably received in the knuckle 122. The shaft 124 and the knuckle 122 are tightly pivoted together for getting a proper friction force there-between to limit the rotation angle of the supporting leg 130 with respect to the base 110.

The supporting leg 130 includes a pivot end 132 and a second free end 134 on another side of the supporting leg 130 opposite to the pivot end 132. The supporting leg 130 is pivotably connected to the base 110 via the shaft 124 at the pivoting end 132 and defines an open-end channel 136 adjacent to the second free end 134. The supporting leg 130 includes a second limiting member 138 frictionally and rotatably connected to the second free end 134 of the supporting leg 130 and received in the open-end channel 136 for retaining one corresponding light 150. The supporting leg 130 further includes a switch 135 attached on the body of the supporting leg 130 and electrically coupled in a circuitry of the cable 140 and the lights 150 to control the lights 150 to turn on/off. Alternatively, a triangular protrusion 137 can be formed on the pivoting end 132 of the supporting leg 130 with an inclined surface 137a having a thickness, relative to the supporting leg 130, gradually rising from the pivoting end 132 towards the second free end 134 of the supporting leg 130. The triangular protrusion 137 leans against the base 110 when the supporting leg 130 is rotated around the shaft 124 of the hinge 120 to form a stable tripod between the legs so as to support an electronic device such as a notebook computer.

The lights 150 are mounted on the first and second limiting members 113 and 138 correspondingly and can be received in the slot 118 and the open-end channel 136 following the first and second limiting members 113 and 138. Alternatively, the number of the lights 150 may vary according to different needs, however, at least one of the lights 150 is employed in present invention.

Figure 3:
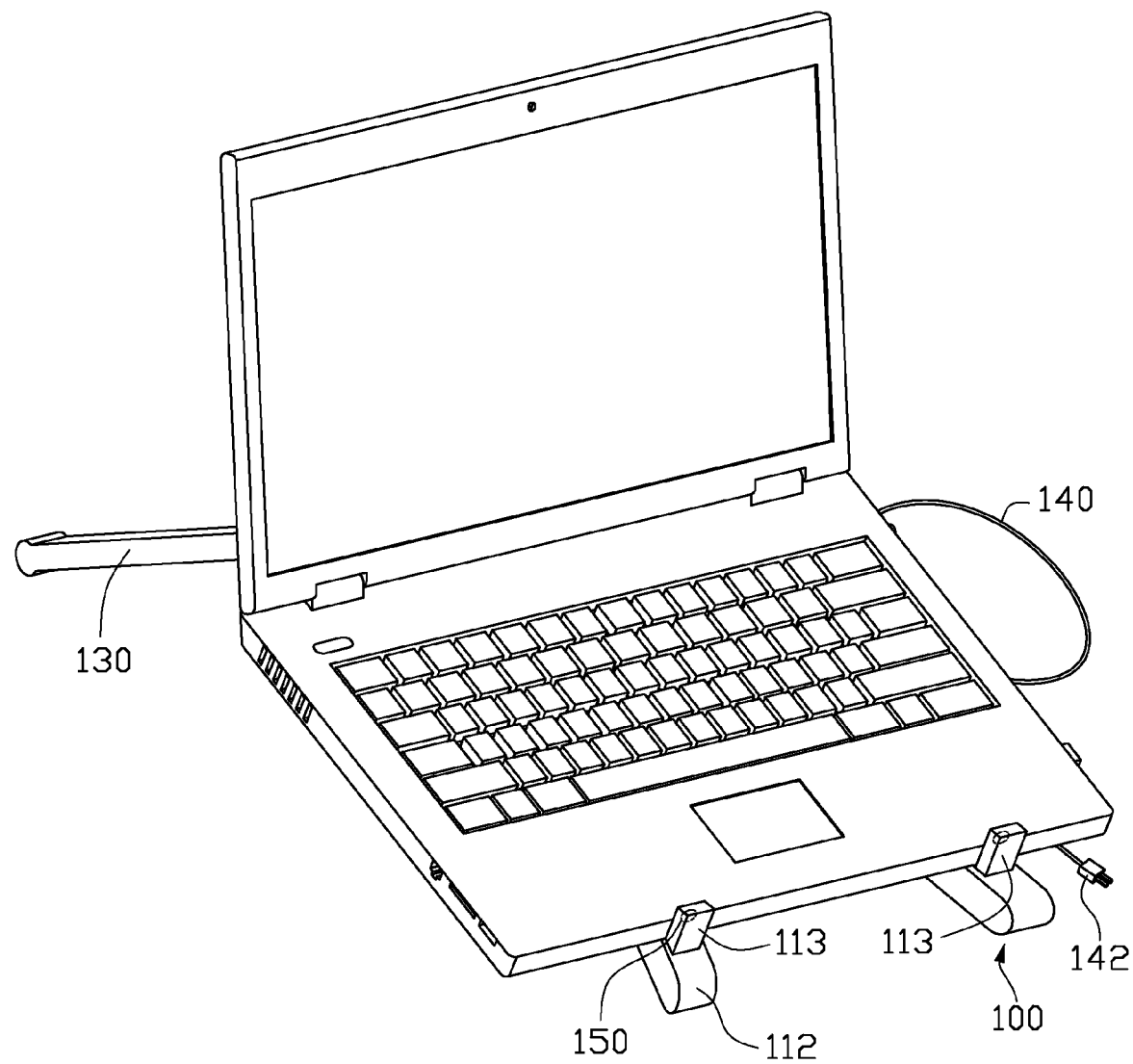
FIG. 3 is an isometric view of the electronic device support of FIG. 1 in a using state.

Referring FIGS. 1 and 3, in use, the supporting leg 130 is rotated relative to the base 110 and positioned at a certain angle between the supporting leg 130 and the base 110. Then, the electronic device support 100 is turned upside down such that the electronic device support 100 stands on a supporting surface, such as a surface of a table, by the first and second free ends 116, 134 to form a stable tripod or a pyramid-like structure. Each of the first limiting members 113 is rotated out perpendicular to the legs 112 to prevent an electronic device e.g., notebook computers, electronics photo frames, liquid crystal televisions from sliding off the supporting surface. The electronic device is supported by the legs 112 of the base 110 by a rear surface. If needed, the supporting leg 130 can be rotated around the knuckle 122 of the hinge 120 to change the angle between the supporting leg 130 and the base 110 to adjust a tilt angle of the electronic device. The connector plug 142 of the cable 140 is plugged into a power source, and the lights 150 mounted on the first limiting member 113 can be turned on by the switch 135 to illuminate the electronic device located on the legs 112 in dark environment. In addition, the bottom surface of the electronic device supported by the electronic device support 100 is at a distance from the table supporting the electronic device support 100, therefore, air can freely flow and can cool the electronic device efficiently.

Figure 4:
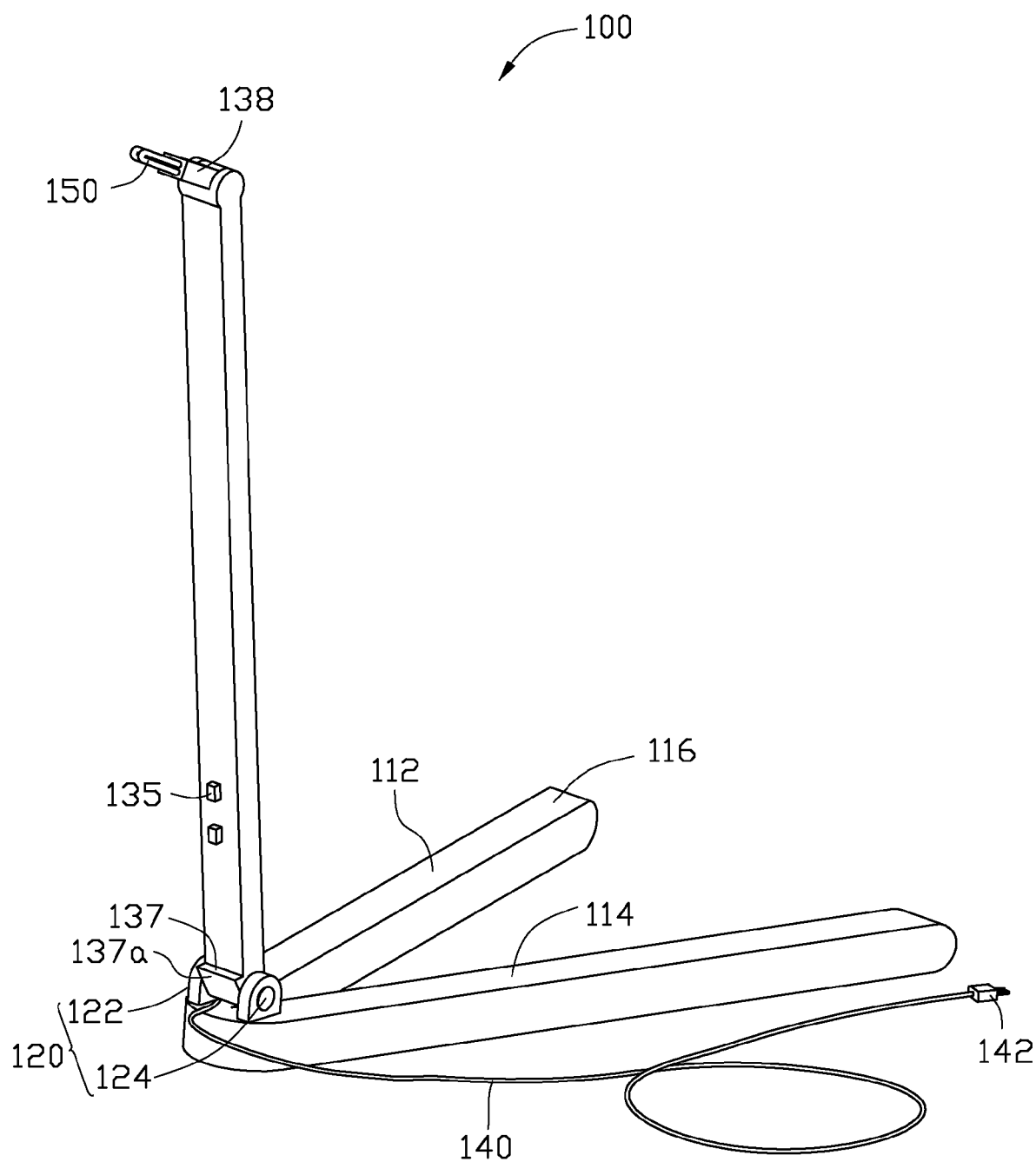
FIG. 4 is an isometric view of the electronic device support of FIG. 1 in another using state.

Referring FIGS. 2 and 4, the electronic device support 100 can also serve as a reading lamp by rotating the supporting leg 130 perpendicular to the base 110 and positioning the base 110 on a supporting surface. After the connector plug 142 of the cable 140 is plugged into a power socket, the light 150 mounted on the second limiting member 138 is unfolded from the channel 136 and turned on by the switch 135 to illuminate the keyboard or the display and the surrounding area. It is to be noted that the shaft 124 and the knuckle 122 are frictionally pivoted together, thereby the position of the supporting leg 130 relative to the base 110 can be maintained by the static friction between the shaft 124 and the knuckle 122.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An electronic device support comprising:
   a V-shaped base comprising a pair of legs extending from an apex;
   a supporting leg pivotably connected to the V-shaped base adjacent to the apex;
   a cable partially embedded in at least one of the legs and the supporting leg by one end and comprising a connector plug electrically connected to the other end of the cable; and
   at least one light rotatably mounted on one of the distal end of the supporting leg away from the apex of the V-shaped base.

2. The electronic device support as claimed in claim 1, wherein the pair of the legs of the base is connected together at an angle.

3. The electronic device support as claimed in claim 2, wherein the angle is less than 180 degrees.

4. The electronic device support as claimed in claim 1, wherein each of the legs defines a slot therein adjacent to a distal end away from the apex of the V-shaped base; and each of the legs further comprises a first limiting member rotatably received in the slot at one end for housing the at least one light.

5. The electronic device support as claimed in claim 4, wherein two pivot points of the each first limiting member in the slot are adjacent to an end wall of the slot thereby the first limiting member is perpendicular to the legs when the first limiting member is rotated out from the slot.

6. The electronic device support as claimed in claim 1, further comprising a hinge pivotably connecting the supporting leg and the V-shaped base.

7. The electronic device support as claimed in claim 6, wherein the hinge comprises a knuckle, and a pivot shaft received in the knuckle; the knuckle is mounted on the base at a surface adjacent to the apex of the base and opposite to the surfaces of the legs defining the slot; and the pivot shaft is mounted on an end of the supporting leg and pivotably received in the knuckle.

8. The electronic device support as claimed in claim 7, wherein the pivot shaft and the knuckle are tightly pivoted together for limiting the rotation range of the supporting leg relative to the base.

9. The electronic device support as claimed in claim 7, wherein the pivot shaft and the knuckle are frictionally pivoted together.

10. The electronic device support as claimed in claim 1, wherein the supporting leg defines an open-end channel therein adjacent to the distal end thereof, and comprises a second limiting member frictionally pivoted to the distal end of the supporting leg and received in the open-end channel for retaining the at least one light.

11. The electronic device support as claimed in claim 10, wherein the supporting leg comprises a switch attached on the body to control the at least one light to turn on/off.

12. The electronic device support as claimed in claim 1, wherein the supporting leg further comprises a triangular protrusion formed on the pivoting end thereof; and the thickness of the triangular protrusion relative to the supporting leg is gradually rising from the pivoting end towards the distal end of the supporting leg.

* * * * *